(12) United States Patent
Umeyama et al.

(10) Patent No.: US 9,761,853 B2
(45) Date of Patent: Sep. 12, 2017

(54) NON-AQUEOUS ELECTROLYTE SECONDARY BATTERY

(71) Applicant: TOYOTA JIDOSHA KABUSHIKI KAISHA, Toyota-shi, Aichi (JP)

(72) Inventors: Hiroya Umeyama, Okazaki (JP); Yusuke Fukumoto, Toyonaka (JP); Naoyuki Wada, Hirakata (JP); Yuji Yokoyama, Moriguchi (JP); Tatsuya Hashimoto, Osaka (JP); Naoto Onodera, Hirakata (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/095,349

(22) Filed: Apr. 11, 2016

(65) Prior Publication Data
US 2016/0336568 A1  Nov. 17, 2016

(30) Foreign Application Priority Data

May 13, 2015  (JP) .................................. 2015-098038

(51) Int. Cl.
*H01M 2/16* (2006.01)
*H01M 10/0525* (2010.01)
*H01M 10/0587* (2010.01)
*H01M 4/13* (2010.01)
*H01M 4/131* (2010.01)
*H01M 4/133* (2010.01)
*H01M 2/14* (2006.01)

(52) U.S. Cl.
CPC ......... *H01M 2/1666* (2013.01); *H01M 2/162* (2013.01); *H01M 2/1653* (2013.01); *H01M 4/13* (2013.01); *H01M 10/0525* (2013.01); *H01M 10/0587* (2013.01); *H01M 2/145* (2013.01); *H01M 2/1686* (2013.01); *H01M 4/131* (2013.01); *H01M 4/133* (2013.01); *Y02T 10/7011* (2013.01)

(58) Field of Classification Search
CPC .. H01M 2/1666; H01M 2/162; H01M 2/1653; H01M 10/0525; H01M 10/0587; H01M 4/13; H01M 4/131; H01M 4/133
See application file for complete search history.

(56) References Cited

U.S. PATENT DOCUMENTS

2010/0233523 A1  9/2010 Jo et al.

FOREIGN PATENT DOCUMENTS

| JP | 2006-092829 A | 4/2006 |
| JP | 2010-500717 A | 1/2010 |

*Primary Examiner* — Jane Rhee
(74) *Attorney, Agent, or Firm* — Sughrue Mion, PLLC

(57) ABSTRACT

Provided is a non-aqueous electrolyte secondary battery in which an increase in resistance is suppressed when high rate pulsed charging and discharging is repeatedly carried out. The non-aqueous electrolyte secondary battery provided by the present disclosure is provided with: a positive electrode; a negative electrode; a separator; and a non-aqueous electrolyte solution. The separator is provided with a separator base made of a non-woven fabric; a first resin layer provided on a surface of the separator base that faces the positive electrode; and a second resin layer provided on a surface of the separator base that faces the negative electrode. In addition, a resin matrix of the first resin layer is constituted from polytetrafluoroethylene or a copolymer containing polytetrafluoroethylene as a primary component, and a resin matrix of the second resin layer is constituted from poly(vinylidene fluoride) or a copolymer containing poly(vinylidene fluoride) as a primary component.

6 Claims, 4 Drawing Sheets

NON-AQUEOUS ELECTROLYTE SECONDARY BATTERY

CROSS-REFERENCE

The present application claims priority on the basis of Japanese Patent Application No. 2015-098038, which was filed on 13 May 2015, and the entire contents of that application are incorporated by reference in the present specification.

BACKGROUND OF THE INVENTION

1. Field of the Invention

Embodiments of the present disclosure relate to a non-aqueous electrolyte secondary battery provided with a wound electrode body.

2. Description of the Related Art

Non-aqueous electrolyte secondary batteries such as lithium secondary batteries are lighter and have higher energy densities than existing batteries, and have therefore been used in the past in so-called portable power sources for personal computers, hand-held devices and the like, in power sources for propelling vehicles, and in residential power storage devices and the like. In particular, non-aqueous electrolyte secondary batteries have been advantageously used in recent years as high output power sources for propelling vehicles such as electric vehicles (EV), hybrid vehicles (HV) and plug in hybrid vehicles (PHV), which have high capacities and are subjected to high rate discharging.

In this type of non-aqueous electrolyte secondary battery, a positive electrode provided with a positive electrode active material layer and a negative electrode provided with a negative electrode active material layer are disposed so as to face each other, with a separator interposed therebetween, and are housed in a battery case together with a non-aqueous electrolyte solution. In general, the non-aqueous electrolyte solution is impregnated in the positive electrode active material layer, negative electrode active material layer and separator. In addition, charging and discharging can be carried out by causing electrolyte ions to move between the positive and negative active material layers and the positive and negative active materials storing and releasing electrolyte ions. Here, proposals have been made regarding features and materials of separators in order to impart separators with high mechanical strength, high electrolyte retention properties and ion conductivity (for example, see Japanese Patent Application Publication No. 2006-092829 and Japanese Patent Application Publication No 2010-500717, etc.).

SUMMARY OF THE INVENTION

Here, modes of use of secondary batteries include high rate charging and discharging, in which large currents are instantaneously charged or discharged (high rate pulsed charging and discharging). Because high rate charging and discharging requires large quantities of charge carriers to move between electrodes instantaneously, deviations in the concentration of the non-aqueous electrolyte solution between the positive and negative electrodes can occur after charging or discharging. In addition, if high rate charging and discharging is repeatedly carried out, deviations in the concentration of the non-aqueous electrolyte solution build up and variations in electrolyte concentration between the positive electrode and negative electrode occur more readily than in cases where low rate charging and discharging is carried out. Typically, the electrolyte is preferentially consumed and the electrolyte concentration can decrease at the surface of the negative electrode. This phenomenon can lead to an increase in resistance during charging and discharging and a deterioration in cycle characteristics during high rate charging and discharging (for example, an increase in resistance caused by high rate charging and discharging), which is not desirable. Such deviations in electrolyte concentration are particularly pronounced during charging and discharging in charging and discharging modes in which high rate and low rate charging and discharging are combined (known as high rate pulsed charging and discharging).

The present disclosure has been devised in order to solve the existing problems mentioned above, and an objective of the present disclosure is to provide a non-aqueous electrolyte secondary battery in which an increase in resistance caused by high rate pulsed charging and discharging is suppressed.

A non-aqueous electrolyte secondary battery provided with a positive electrode, a negative electrode, a separator interposed between the positive electrode and negative electrode, and a non-aqueous electrolyte solution is provided by the present disclosure in order to achieve this objective. In this secondary battery, the separator is provided with a separator base made of a non-woven fabric, a first resin layer provided on a surface of the separator base that faces the positive electrode, and a second resin layer provided on a surface of the separator base that faces the negative electrode. In addition, the first resin layer is characterized by being constituted mainly from polytetrafluoroethylene (PTFE) or a copolymer thereof, and the second resin layer is characterized by being constituted mainly from poly (vinylidene fluoride) (PVDF) or a copolymer thereof.

By means of these features, non-aqueous electrolyte solution discharged from the negative electrode can be retained due to the second resin layer, which consists mainly of PVDF, swelling. In addition, non-aqueous electrolyte solution discharged from the positive electrode passes through the separator base without being trapped by the first resin layer, which consists mainly of PTFE, and is transported to the negative electrode side. In this way, a large quantity of non-aqueous electrolyte solution can be held in the vicinity of the negative electrode and variations in the concentration of the electrolyte solution can be suppressed. In addition, an increase in the resistance of the secondary battery, which can occur if high rate pulsed charging and discharging is repeatedly carried out, can be advantageously suppressed. In this way, a non-aqueous electrolyte secondary battery having, for example, excellent long-term durability is provided.

In a preferred aspect of the non-aqueous electrolyte secondary battery disclosed here, the separator base is characterized by having a Gurley value, as determined using the Gurley test method, of not less than 40 sec/100 mL and not more than 55 sec/100 mL. According to this constitution, even if a separator base having a low Gurley value such as that mentioned above is used, it is possible to suppress variations in the concentration of the non-aqueous electrolyte solution and prevent an increase in resistance caused by high rate pulsed charging and discharging cycles.

Moreover, in the present specification, Gurley value means a value measured in accordance with the Gurley test method specified in JIS P 8117: 2009.

In a preferred aspect of the non-aqueous electrolyte secondary battery disclosed here, at least one of the first resin layer and second resin layer contains insulating inorganic particles. By having such a feature, it is possible to increase the heat resistance of the secondary battery and achieve a secondary battery that exhibits high safety. In addition, it is possible to achieve a significant decrease in resistance.

In a preferred aspect of the non-aqueous electrolyte secondary battery disclosed here, an average thickness of the first resin layer and that of the second resin layer are each 7 µm or less. By having such a feature, a decrease in resistance can be efficiently achieved.

In a preferred aspect of the non-aqueous electrolyte secondary battery disclosed here, the positive electrode includes a positive electrode active material layer on a surface of a positive electrode current collector and the negative electrode includes a negative electrode active material layer on a surface of a negative electrode current collector, and an average pore diameter in the negative electrode active material layer is greater than an average pore diameter in the positive electrode active material layer. If the average pore diameter in the negative electrode active material layer is greater than that in the positive electrode active material layer, variations in electrolyte concentration readily occur upon high rate pulsed charging and discharging. According to the feature disclosed here, however, even if the average pore diameter of the negative electrode active material layer and that of the positive electrode active material layer have the relationship mentioned above, it is possible to suppress variations in the concentration of the non-aqueous electrolyte solution caused by high rate pulsed charging and discharging and prevent an increase in resistance.

In a preferred aspect of the non-aqueous electrolyte secondary battery disclosed here, the positive electrode, the negative electrode and the separator have an elongated shape, and a wound electrode body is constituted by overlaying and winding the positive electrode and the negative electrode in such a way as to be insulated from each other by the separator. In cases where the electrodes constitute a wound electrode body, problems occur due to swelling and contraction of the active material layers upon charging and discharging being restricted by the winding and the non-aqueous electrolyte solution being discharged from the wound electrode body. This problem can be particularly prominent in batteries in which high rate charging and discharging is carried out. According to the features disclosed here, the compositions of the resin layers in the separator and the positional relationship of the separator with respect to the electrodes are appropriately regulated, and even if high rate charging and discharging (and especially high rate pulsed charging and discharging) is carried out, it is possible to advantageously suppress discharge of the non-aqueous electrolyte solution from the wound electrode body and prevent loss of non-aqueous electrolyte solution and an increase in resistance.

Moreover, in the present application, high rate means discharging or discharging that is carried out at a high current of greater than 1 C (that is, a current in excess of 1 C). For example, high rate means discharging or discharging at a high current of 3 C or higher, for example 5 C or higher, preferably 10 C or higher, and particularly preferably 20 C or higher. Moreover, 1 C means a current at which discharging is complete after 1 hour when a secondary battery having a nominal capacity is subjected to constant current discharging.

In addition, in the present application, high rate charging and discharging means a charging and discharging mode in which at least one of discharging and discharging is carried out at a high rate. In other words, this includes ordinary high rate charging and discharging. In addition, in the present application, high rate pulsed charging and discharging means a charging and discharging mode in which only one of discharging and discharging is carried out at a high rate. Specifically, this can be a mode in which discharging (or charging) is carried out at a high rate and the same amount of electricity is then charged (or discharged) at a low rate that is lower than the discharging (or charging) rate. The difference between the charging and discharging rates can be 2 C or more (and preferably 5 C or more). It has been confirmed that by carrying out this high rate pulsed charging and discharging, the balance between charging and discharging is worse than ordinary high rate charging and discharging in which both charging and discharging are carried out at high rates, and deviations in the position of the non-aqueous electrolyte solution in the electrode body readily occur.

DETAILED DESCRIPTION OF THE INVENTION

Figure 1:
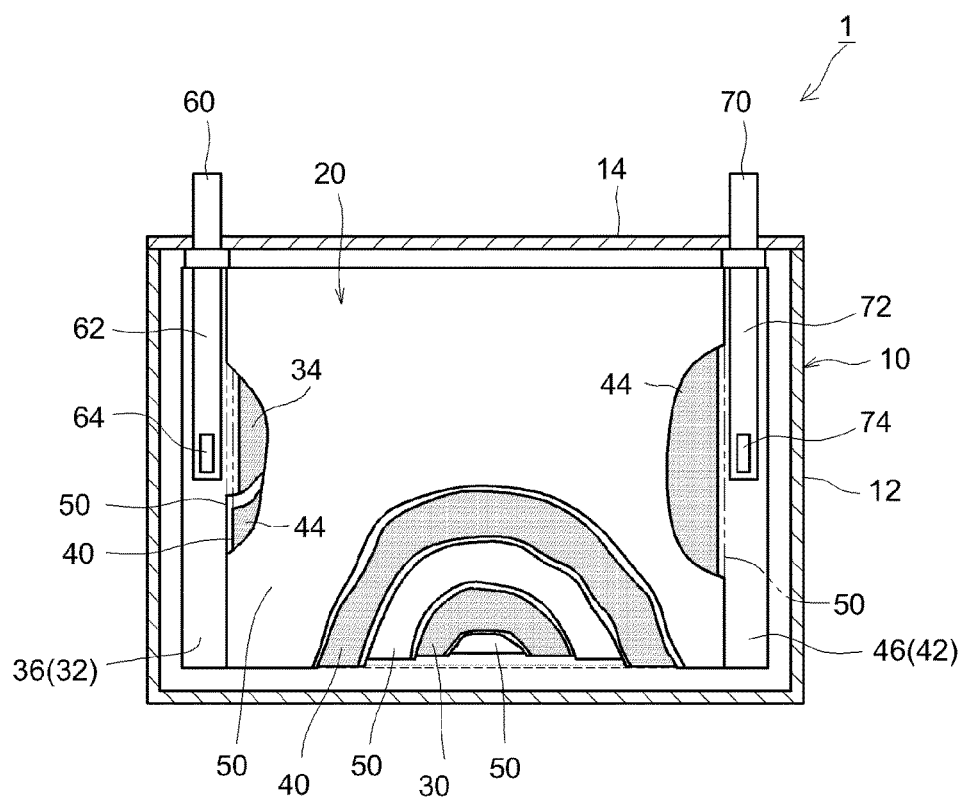
FIG. 1 is a cross-sectional view showing a schematic representation of the features of a non-aqueous electrolyte secondary battery according to one embodiment of the present disclosure.

Embodiments of the non-aqueous electrolyte secondary battery of the present disclosure will now be explained while referring to the drawings as appropriate. Moreover, matters which are essential for carrying out the disclosure and which are matters other than those explicitly mentioned in this specification (for example, battery structures and the like that do not characterize the present disclosure) are matters that a person skilled in the art could understand to be matters of design on the basis of the prior art in this technical field. The present disclosure can be carried out on the basis of the matters disclosed in the present specification and common general technical knowledge in this technical field. In addition, dimensions shown in the drawings below (lengths, widths, thicknesses, and so on) do not necessarily reflect actual dimensions.

In the present specification, the term "non-aqueous electrolyte secondary battery" means a battery which uses a non-aqueous electrolyte solution as an electrolyte and which can be repeatedly charged and discharged, and encompasses secondary batteries which use electrolyte ions (lithium ions in the case of lithium ion batteries) as charge carriers and in which charging and discharging is carried out by the movement of these charge carriers between the negative and positive electrodes. In general, secondary batteries known as lithium ion batteries and lithium polymer batteries and the like are typical examples that are encompassed by the non-aqueous electrolyte secondary battery set forth in the present specification. In addition, the term "active material" in the present specification means a material able to reversibly store and release chemical species (for example, lithium ions) that act as charge carriers. Therefore, detailed explanations will now be given using, as an example, a case in which the non-aqueous electrolyte secondary battery disclosed here is a lithium ion battery.

[Lithium Ion Battery]

Figure 2:
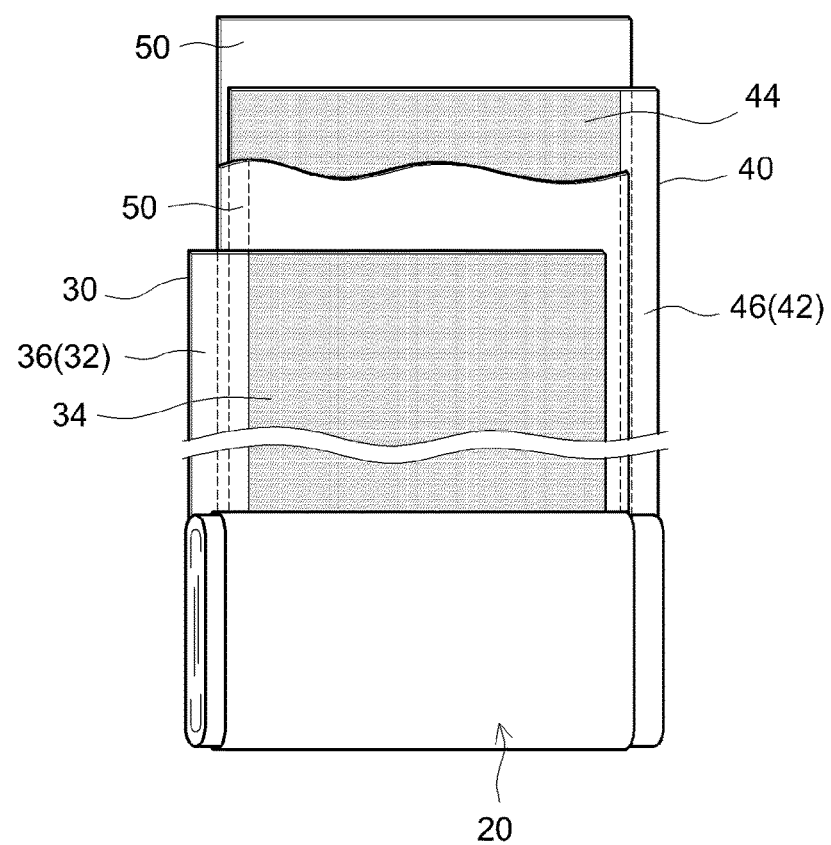
FIG. 2 is a schematic diagram that explains the constitution of a wound electrode body.
Figure 3:
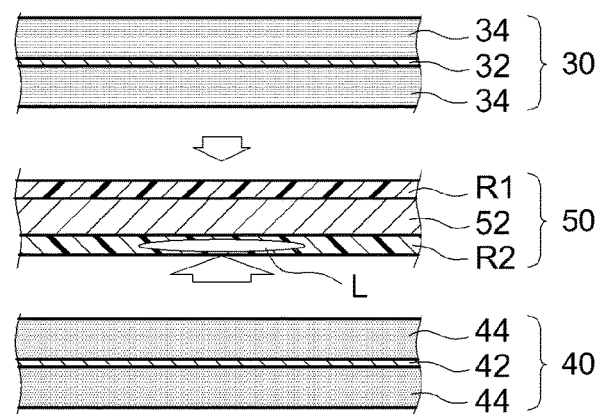
FIG. 3 is a split cross-sectional view showing a schematic representation of a part of an electrode body according to one embodiment.

FIG. 1 is a cross-sectional view showing a schematic representation of the features of an embodiment of a non-aqueous electrolyte secondary battery (a lithium ion battery in this case) 1. This lithium ion battery 1 is provided with a positive electrode 30, a negative electrode 40, a separator 50 interposed between the positive electrode 30 and negative electrode 40, and a non-aqueous electrolyte solution (not shown). In the present example, an electrode body, which is obtained by overlaying a long positive electrode 30 and a long negative electrode 40, with two separators 50 interposed therebetween, constitutes a wound electrode body 20 by being wound, with the winding axis being the transverse direction that is perpendicular to the longitudinal direction, as shown in FIG. 2. This wound electrode body 20 is housed in a battery case 10 together with a non-aqueous electrolyte solution. The features disclosed here are not limited to batteries having the wound electrode body 20, and can be widely used in batteries having electrode bodies of various forms, such as laminated electrode bodies in which a plurality of electrode bodies are laminated. FIG. 3 is a diagram that explains a part of a cross-sectional structure of an electrode body.

[Positive Electrode]

Typically, the positive electrode 30 is provided with a long positive electrode current collector 32 (which may be band-like) and a positive electrode active material layer 34 that is supported on a surface of this positive electrode current collector 32. Typically, a current collector exposed part 36 is provided in a band-like manner along one edge in the longitudinal direction of the positive electrode current collector 32, and the positive electrode active material layer 34 is provided in a band-like manner on those parts other than the current collector exposed part 36. The positive electrode active material layer 34 may be provided on both surfaces or only one surface of the positive electrode current collector 32. The positive electrode current collector 32 is preferably an electrically conductive member consisting of a metal that exhibits good electrical conductivity (for example, aluminum or nickel). This positive electrode active material layer 34 contains at least a positive electrode active material and has a porous structure that allows impregnation by a non-aqueous electrolyte solution.

Here, the positive electrode active material is not particularly limited, but a material able to store and release lithium ions, for example a lithium-containing compound containing lithium element and one or two or more types of transition metal element (for example, a lithium transition metal composite oxide), can be advantageously used. This type of lithium transition metal composite oxide can be, for example, a lithium-nickel composite oxide (for example, $LiNiO_2$), a lithium-cobalt composite oxide (for example, $LiCoO_2$), a lithium-manganese composite oxide (for example, $LiMn_2O_4$) or a ternary lithium-containing composite oxide such as a lithium-nickel-cobalt-manganese composite oxide (for example, $LiNi_{1/3}Co_{1/3}Mn_{1/3}O_2$). A variety of metallic elements can be added to these active materials in order to achieve the desired battery performance.

In addition to the positive electrode active material, the positive electrode active material layer 34 may, if necessary, contain one or two or more materials able to be used as constituent components of positive electrode active material layers in ordinary lithium ion batteries. Examples of such materials include electrically conductive materials and binders. Examples of electrically conductive materials able to be advantageously used include carbon materials such as a variety of types of carbon black (for example, acetylene black and ketjen black), activated carbon, graphite and carbon fibers. In addition, a vinyl halide-based resin such as poly(vinylidene fluoride) (PVDF) or a poly(alkylene oxide) such as poly(ethylene oxide) (PEO) can be advantageously used as a binder.

From the perspective of achieving high energy density, the proportion of the positive electrode active material relative to the overall positive electrode active material layer 34 should be approximately 60 mass % or higher (typically 60 to 95 mass %), and it is generally preferable for this proportion to be approximately 70 to 95 mass %. In addition, in cases where a binder is used, the proportion of the binder relative to the overall positive electrode active material layer can be, for example, approximately 0.5 to 10 mass %, and it is generally preferable for this proportion to be approximately 1 to 5 mass % from the perspective of advantageously ensuring mechanical strength (shape retention properties). In cases where an electrically conductive material is used, the proportion of the electrically conductive material relative to the overall positive electrode active material layer can be, for example, 1 to 20 mass %, and it is generally preferable for this proportion to be approximately 2 to 10 mass % from the perspective of achieving both output characteristics and energy density at high levels.

In addition, the average thickness (on each surface of the positive electrode current collector) of the positive electrode active material layer 34 is not particularly limited, but can be, for example, 20 μm or higher, and typically 50 μm or higher, and 200 μm or lower, and typically 100 μm or lower. From the perspective of achieving high energy density, the mass (mass per unit area) of the positive electrode active material layer 34 provided per unit area of the positive electrode current collector 32 should be 3 mg/cm² or higher (for example, 5 mg/cm² or higher, and typically 7 mg/cm² or higher) on each surface of the positive electrode current collector 32. From the perspective of achieving excellent output characteristics, the mass (mass per unit area) of the positive electrode active material layer 32 provided per unit area of the positive electrode current collector should be 100 mg/cm² or lower (for example, 70 mg/cm² or lower, and typically 50 mg/cm² or lower). In addition, the density of the positive electrode active material layer 34 should be, for example, 1.0 g/cm³ or higher (and typically 2.0 g/cm³ or higher), and 4.5 g/cm³ or lower (for example, 4.0 g/cm³ or lower). Furthermore, although not particularly limited, the average pore diameter in the positive electrode active material layer 34 should be, for example, 0.08 μm or higher (and typically 0.1 μm or higher) and 0.5 μm or lower (for example, 0.25 μm or lower).

[Negative Electrode]

Typically, the long negative electrode 40 is such that a current collector exposed part 46 is provided along one edge in the longitudinal direction of the long negative electrode current collector 42, and the active material layer 44 is provided on those parts other than the current collector exposed part 46. Typically, the negative electrode current collector exposed part 46 is provided along one edge, in the transverse direction, of the negative electrode current collector 42. The negative electrode active material layer 44 may be provided on both surfaces or only one surface of the negative electrode current collector 42. The negative electrode current collector 42 is preferably an electrically conductive member consisting of a metal that exhibits good electrical conductivity (for example, copper or nickel). This negative electrode active material layer 44 contains at least a negative electrode active material and has a porous structure that allows impregnation by a non-aqueous electrolyte solution.

Here, the negative electrode active material is not particularly limited, but can be one or two or more materials known as being able to be used as negative electrode active materials in lithium ion batteries. Preferred examples thereof include a variety of carbon materials, such as graphite, poorly graphitizable carbon (hard carbon), readily graphitizable carbon (soft carbon), carbon nanotubes, and materials obtained by combining these. Of these, graphite-based materials such as natural graphite (black lead) and artificial graphite can be advantageously used from the perspective of energy density. Materials obtained by disposing amorphous carbon on at least a part of the surface of such graphite-based materials can be advantageously used. A form in which almost the entire surface of a granular carbon material is coated with a film of amorphous carbon is more preferred.

Moreover, in addition to the negative electrode active material, the negative electrode active material layer 44 may, if necessary, contain one or two or more materials able to be used as constituent components of negative electrode active material layers 44 in ordinary lithium ion batteries. Examples of such materials include binders and a variety of additives. Binders similar to those used in negative electrodes of ordinary lithium ion batteries can be used as appropriate as the binder. For example, it is possible to use a binder similar to that used in the positive electrode 30. In cases where an aqueous solvent are used in order to form the negative electrode active material layer 44, which is a preferred mode, a rubber such as a styrene-butadiene rubber (SBR) or a water-soluble polymeric material or water-dispersible polymeric material, such as poly(ethylene oxide) (PEO) or a vinyl acetate copolymer, can be advantageously used. In addition, a variety of additives, such as thickening agents, dispersing agents and electrically conductive materials, can be used as appropriate. For example, examples of thickening agents include cellulose-based polymers such as carboxymethyl cellulose (CMC), methyl cellulose (MC) and cellulose acetate phthalate (CAP).

The proportion of the negative electrode active material relative to the overall negative electrode active material layer 44 is not particularly limited, but should be approximately 50 mass % or higher, and it is generally preferable for this proportion to be 90 to 99 mass % (for example, 95 to 99 mass %). In this way, high energy density can be achieved. In cases where a binder is used, the proportion of the binder relative to the overall negative electrode active material layer 44 can be, for example, approximately 1 to 10 mass %, and it is generally preferable for this proportion to be approximately 1 to 5 mass %. In this way, it is possible to advantageously maintain the mechanical strength (shape retention properties) of the negative electrode active material layer 44 and achieve good durability. In cases where a thickening agent is used, the proportion of the thickening agent relative to the overall negative electrode active material layer 44 can be, for example, approximately 1 to 10 mass %, and it is generally preferable for this proportion to be approximately 1 to 5 mass %.

From the perspective of achieving high energy density and high output density, the mass (mass per unit area) of the negative electrode active material layer 44 provided per unit area of the negative electrode current collector 42 should be 5 mg/cm$^2$ or higher (and typically 7 mg/cm$^2$ or higher) and 20 mg/cm$^2$ or lower (and typically 15 mg/cm$^2$ or lower) on each surface of the negative electrode current collector 42. In addition, the thickness of the negative electrode active material layer 44 on each surface of the negative electrode current collector should be, for example, 40 μm or higher (and typically 50 μm or higher) and 100 μm or lower (and typically 80 μm or lower). In addition, the density of the negative electrode active material layer 44 should be, for example, 0.5 g/cm$^3$ or higher (and typically 1.0 g/cm$^3$ or higher), and 2.0 g/cm$^3$ or lower (and typically 1.5 g/cm$^3$ or lower). Furthermore, although not particularly limited, the average pore diameter in the negative electrode active material layer 44 should be, for example, 0.8 μm or higher (and typically 1 μm or higher) and 3 μm or lower (for example, 2.5 μm or lower).

[Separator]

The separator 50 is a constituent member which insulates the positive electrode 30 from the negative electrode 40, retains charge carriers, and allows the passage of these charge carriers. In the feature disclosed here, the separator 50 has, as shown in FIG. 3, a separator base 52, a first resin layer R1, which is provided on the surface of the separator base 52 that faces the positive electrode 30, and a second resin layer R2, which is provided on the surface of the separator base 52 that faces the negative electrode 40. The first and second resin layers R1 and R2 and the separator base 52 may simply be overlaid, but may also be integrally joined to each other. The separator is not necessarily limited to such a constitution, but it is preferable for the first and second resin layers R1 and R2 and the separator base 52 to be integrally joined to each other to form a laminated structure.

The separator base 52 is constituted from a non-woven fabric. For example, a variety of materials that are molded and integrated into the form of a sheet without weaving long fibers can be considered for the non-woven fabric. For example, this type of non-woven fabric can be in the form of an interlaced integrated sheet without binding long fibers, but may also be one in which long fibers are directly bound to each other at intersection points or bound to each other at intersection points by means of a binder. The material that constitutes the non-woven fabric is not particularly limited, but it is possible to constitute the non-woven fabric from a material that is electrochemically stable as a lithium ion battery separator. Examples of materials that constitute the non-woven fabric include fibers of styrene-based resins such as polystyrene; polyolefin-based resins such as polyethylene (PE), polypropylene (PP) and poly(vinyl chloride); amide-based resins such as polyamides; thermoplastic elastomers of these resins; polyester-based resins such as polyesters and poly(ethylene terephthalate) (PET); cellulose-based resins such as cellulose; and sulfone-based resins such as poly (phenylene sulfide) (PPS). For example, a preferred example of this type of material is a resin which has the function of softening or melting when the temperature of the battery increases to a prescribed temperature, thereby inhibiting the movement of charge carriers and stopping the battery reaction (a shutdown function). Specifically, it is typically preferable for this material to consist of, for example, a polyolefin resin. Meanwhile, the feature disclosed here can also impart a shutdown function to the second resin layer, as explained later. In such cases, the non-woven fabric can be more advantageously constituted from a high strength material that is unlikely to melt, such as a polyester-based resin, amide-based resin or sulfone-based resin.

The Gurley value (air permeability) of the separator base 52 is not particularly limited, but can be, for example, not lower than 0 sec/100 mL and not higher than 100 sec/100 mL (lower than 100 sec/100 mL is possible). By lowering the Gurley value of the separator base 52 to 100 sec/100 mL or lower, charge carriers such as lithium ions can migrate more favorably than in the case of, for example, a conventional microporous film (having a Gurley value of approximately 100 to 400 sec/100 mL). The upper limit of the Gurley value of the separator base 52 is preferably 60 sec/100 mL or lower, more preferably 55 sec/100 mL or lower, and particularly preferably 50 sec/100 mL or lower (for example, lower than 50 sec/100 mL). The lower limit of the Gurley value is not limited, but can be, for example, 10 sec/100 mL or higher or 20 sec/100 mL or higher, preferably 40 sec/100 mL or higher (for example, higher than 40 sec/100 mL) and particularly preferably 45 sec/100 mL or higher. By having such a constitution, charge carriers can move smoothly within the separator, and an increase in resistance can be advantageously suppressed even in cases where, for example, high rate pulsed charging and discharging is repeatedly carried out. Moreover, the separator base 52 may be a non-woven fabric having a single layer structure, but may also have a laminated structure obtained by laminating two or more types of non-woven fabrics having different materials or properties (fiber thickness or density (porosity), non-woven fabric thickness, or the like).

Moreover, by using a separator base 52 having such a low Gurley value in isolation as the separator 50, resistance to movement of charge carriers is reduced, but charge carrier imbalance readily occurs. Diligent research by the inventors of the present disclosure has confirmed that the following matters occur when the separator base 52 is used in isolation as a separator. For example, if high rate charging and discharging is carried out by carrying out both charging and discharging at a high rate, the non-aqueous electrolyte solution readily migrates and electrolyte solution pockets are readily formed (see FIG. 4A below). Conversely, if high rate pulsed charging and discharging is carried out by carrying out either charging or discharging at a high rate, the balance between charging and discharging deteriorates, the formation of electrolyte solution pockets becomes faster, and the non-aqueous electrolyte solution, which has formed pockets due to the charging and discharging, is readily discharged to outside the electrode body. Therefore, the feature disclosed here is one in which the surfaces of the separator base 52 are covered with the resin layers R1 and R2.

A resin matrix of the first resin layer R1 contains polytetrafluoroethylene (PTFE) or a copolymer containing polytetrafluoroethylene as a primary component (that is, the resin matrix can be a homopolymer or copolymer). The polytetrafluoroethylene copolymer is not particularly limited, and can be, for example, a tetrafluoroethylene-ethylene copolymer (ETFE), a tetrafluoroethylene-hexafluoropropylene copolymer (FEP), a tetrafluoroethylene-perfluoroalkyl vinyl ether copolymer (PFA), or the like. Here, having PTFE as a "primary component" means that PTFE is the component having the highest content among the resin components (resin units) that constitute the copolymer. Typically, PTFE accounts for 50 mass % or more, preferably 70 mass % or more, more preferably 80 mass % or more, and particularly preferably 90 mass % or more, of the components that constitute the resin layer. In addition, resin matrix means the resin components that constitute the first resin layer R1. In cases where the first resin layer R1 contains the insulating inorganic particles mentioned below, the resin matrix can be the resin components that constitute the first resin layer R1, and excludes these insulating inorganic particles. The first resin layer R1 is preferably such that the resin matrix is constituted substantially from PTFE only. The first resin layer R1 may be in the form of a microporous sheet, a non-woven sheet, or the like.

Here, PTFE hardly swells in the non-aqueous electrolyte solution, has a melting point that is higher than 350° C., does not melt at a temperature of approximately 350° C., and has the property of maintaining a stable shape. In addition, PTFE exhibits excellent chemical stability. By disposing the first resin layer R1, which consists mainly of this type of PTFE, on the surface of the separator 50 that faces the positive electrode, in cases where the non-aqueous electrolyte solution is discharged from the positive electrode active material layer 34 as a result of swelling and contraction, the first resin layer R1 does not absorb the non-aqueous electrolyte solution and the non-aqueous electrolyte solution can be transported to the separator base 52 and the second resin layer R2, which is described later. In this way, the non-aqueous electrolyte solution can be supplied to the vicinity of the negative electrode 40 and it is possible to prevent a shortage of electrolyte in the vicinity of the negative electrode 40. In addition, when the separator base 52 or the second resin layer R2 described later are imparted with a shutdown function, the first resin layer R1 can maintain the shutdown function without softening or melting even at the shutdown temperature of the separator base 52 or second resin layer R2. That is, the first resin layer R1 is advantageous due to also functioning as a heat-resistant layer and being able to increase the safety of the secondary battery 1. Furthermore, PTFE is also preferred from the perspective of imparting the vicinity of the positive electrode with resistance to oxidizing environments.

A resin matrix of the second resin layer R2 contains poly(vinylidene fluoride) (PVDF) or a copolymer containing poly(vinylidene fluoride) as a primary component (that is, the resin matrix can be a homopolymer or copolymer). The poly(vinylidene fluoride) copolymer is not particularly limited, and can be, for example, a vinylidene fluoride-vinyl fluoride copolymer, a vinylidene fluoride-trifluoroethylene copolymer, a vinylidene fluoride-chlorotrifluoroethylene copolymer, or the like. Here, having PVDF as a "primary component" means that PVDF is the component having the highest content among the resin components (resin units) that constitute the copolymer. Typically, PVDF accounts for 50 mass % or more, preferably 70 mass % or more, more preferably 80 mass % or more, and particularly preferably 90 mass % or more, of the components that constitute the resin layer. In addition, the resin matrix of the second resin layer R2 means the resin components that constitute the second resin layer R2. In cases where the second resin layer R2 contains the insulating inorganic particles mentioned below, the resin matrix can be the resin components that constitute the second resin layer R2, and excludes these insulating inorganic particles. The second resin layer R2 is preferably such that the resin matrix is constituted substantially from PVDF only. The second resin layer R2 may be in the form of a microporous sheet, a non-woven sheet, or the like.

Figure 4A:
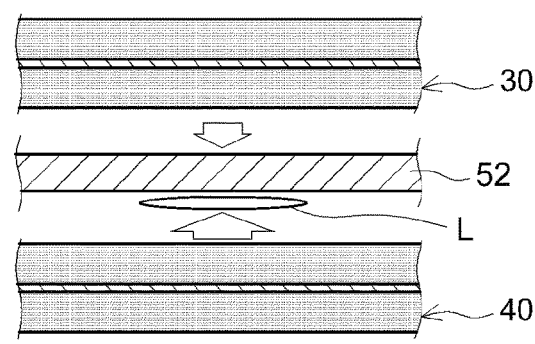
FIG. 4A is a split cross-sectional view showing a schematic representation of a part of a cross-sectional structure of a conventional electrode body.

Moreover, because the electrodes 30 and 40 (and specifically the active material layers 34 and 44) in the secondary battery 1 undergo rapid swelling and contraction when a high rate charging and discharging is carried out, gaps are formed between the electrodes 30 and 40 and the separator 50. Here, in cases where a non-woven fabric not having the resin layers R1 and R2 (for example, the separator base 52 only) is used as the separator, non-aqueous electrolyte solution discharged from the electrodes 30 and 40 is thought to accumulate in these gaps. Because the negative electrode active material layer 44 generally has a larger average pore diameter than the positive electrode active material layer 34 in the secondary battery 1, the non-aqueous electrolyte solution is readily discharged from the negative electrode 40 side, and a liquid pocket L is readily formed between the negative electrode 40 and the separator (in this case, the separator base 52), as shown in FIG. 4A for example. It appears that this type of liquid pocket L exhibits an effect similar to retention of the non-aqueous electrolyte solution, but the liquid pocket is in contact with the separator-based material 52 and can cause a short circuit between the positive electrode 30 and negative electrode 40, and can be a cause of loss of function of the battery. In addition, the liquid pocket L is readily discharged to outside the electrode body as a result of repeated charging and discharging, and re-impregnation can be difficult. This tendency can be particularly pronounced in cases where the electrode body is a wound electrode body.

Figure 4B:
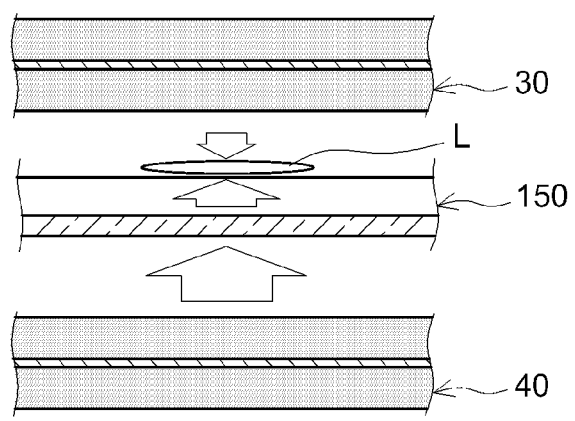
FIG. 4B is a split cross-sectional view showing a schematic representation of a part of a cross-sectional structure of another conventional electrode body.

Moreover, a heat-resistant layer (HRL)-equipped separator 150, which was obtained by providing a HRL containing an inorganic filler (insulating inorganic particles) on one surface (typically on the negative electrode side) of a separator base consisting of a microporous resin sheet, was used in the past in order to ensure insulation between the positive and negative electrodes in cases where the battery temperature increased. In cases where this type of HRL-equipped separator 150 is used, non-aqueous electrolyte solution discharged from the negative electrode 40 passes through the heat-resistant layer, which has a higher average pore diameter, also passes through the microporous sheet, reaches the positive electrode 30 side, and can form a liquid pocket L, as shown in FIG. 4B for example.

This liquid pocket L is readily discharged to outside the electrode body as a result of repeated charging and discharging, and re-impregnation can be difficult. That is, variations in the concentration of the non-aqueous electrolyte solution occur between the positive electrode 30 and the negative electrode 40, and these variations in concentration can become pronounced whenever high rate charging and discharging is repeatedly carried out.

However, PVDF has the property of expanding in the non-aqueous electrolyte solution. In the feature disclosed here, by disposing the second resin layer R2, which consists mainly of PVDF, on the surface of the separator 50 that faces the negative electrode, when non-aqueous electrolyte solution is discharged from the negative electrode active material layer 44 as a result of swelling and contraction, the second resin layer R2 can advantageously take in the non-aqueous electrolyte solution. Non-aqueous electrolyte solution impregnated in the second resin layer R2 is prevented from being pushed into the separator base 52 upon swelling and contraction. In this way, non-aqueous electrolyte solution discharged from the negative electrode active material layer 44 can be retained in the vicinity of the negative electrode active material layer 44, and variations in the concentration of non-aqueous electrolyte solution between the positive electrode 30 and negative electrode 40 can be advantageously suppressed.

Moreover, the quantity of electrolyte solution held by the second resin layer R2 can be adjusted by, for example, altering the thickness, porosity, or the like, of the second resin layer R2. Therefore, by adjusting, for example, the thickness of the second resin layer R2 according to the constitution of the battery, it is possible to prevent non-aqueous electrolyte solution discharged from the negative electrode active material layer 44 from reaching the separator base 52. In this way, non-aqueous electrolyte solution can be stably retained in the vicinity of the negative electrode 40.

Moreover, PVDF is polymorphous, includes $\alpha$, $\beta$ and $\gamma$ forms, and typically has a structure in which a mixture of these forms is present. In addition, for example PVDF has a crystallization temperature of approximately 130° C. (for example, 120 to 160° C.), can form porous PVDF by crystallizing at a low temperature, and can achieve a shutdown function due to crystals melting and pores becoming sealed when PVDF is heated. Therefore, in cases where the battery temperature increases, movement of electrolyte is impeded by the second resin layer R2, and it is possible to achieve a shutdown function that stops the battery reaction.

Polytetrafluoroethylene and poly(vinylidene fluoride), which are the main constituent components of the first resin layer R1 and the second resin layer R2, are materials that have been able to be used in the past as fluororesins used as separator materials and the like in secondary batteries. However, polytetrafluoroethylene and poly(vinylidene fluoride) differ in terms of characteristics inside secondary batteries, and by disposing these materials at appropriate locations, it is possible to achieve the previously unknown effect of suppressing variations in the concentration of a non-aqueous electrolyte solution. This is an effect that cannot be achieved simply by disposing either of the first resin layer R1 or the second resin layer R2, and is an uncommon characteristic that has been achieved for the first time by disposing both of these layers at appropriate positions.

Moreover, as long as the first resin layer R1 and the second resin layer R2 are the main constituents, these layers R1 and R2 may contain particles of an insulating inorganic compound (an inorganic filler) in order to, for example, prevent internal short circuits in the battery and improve heat resistance. Here, particles of, for example, metal oxides, metal hydroxides, and the like, can be considered as the inorganic compound particles. For example, inorganic metal compounds such as alumina ($Al_2O_3$), hydrated alumina (for example, boehmite ($Al_2O_3 \cdot H_2O$)), silica ($SiO_2$), zirconia ($ZrO_2$), yttria ($Y_2O_3$), mullite ($Al_6O_{13}Si_2$), magnesium hydroxide ($Mg(OH)_2$) and magnesium carbonate ($MgCO_3$) can be given as preferred examples thereof. It is possible to use one of these inorganic compounds in isolation, or a combination of two or more types thereof. Particles having an average particle diameter of, for example, 0.01 to 0.8 µm (and preferably 0.02 to 0.5 µm, for example 0.05 to 0.1 µm) can be advantageously used as these inorganic compound particles.

The proportion of inorganic compound particles in the resin layers R1 and R2 is not particularly limited, but it is preferable that this proportion is not too high, because if this proportion is too high, it can be difficult to achieve the effect of suppressing variations in the concentration of the non-aqueous electrolyte solution by using these resins. From this perspective, the proportion of inorganic compound particles in the resin layers R1 and R2 is preferably 50 mass % or lower (for example, lower than 50 mass %), more preferably 45 mass % or lower, and particularly preferably 30 mass % or lower. The lower limit of the proportion of inorganic compound particles is not particularly limited, but is preferably 5 mass % or higher, more preferably 10 mass % or higher, and particularly preferably 15 mass % or higher.

In a constitution in which the first resin layer R1 and/or the second resin layer R2 contain inorganic compound particles, the resins that constitute the resin layers (polytetrafluoroethylene or the like, or poly(vinylidene fluoride) or the like) may also act as a binder resin that binds these inorganic compound particles to the separator base 52.

The thicknesses (average thicknesses, hereinafter also) of the separator base 52, the first resin layer R1 and the second resin layer R2 are not particularly limited, and it is possible to set appropriate ranges within which the characteristics required of the secondary battery can be achieved. For example, the overall thickness of the separator is not particularly limited, but is generally, for example, 10 μm or higher, and typically 15 μm or higher, for example 17 μm or higher. In addition, the upper limit of this overall thickness can be 40 μm or lower, and typically 30 μm or lower, for example 25 μm or lower. By setting this average thickness to fall within the range mentioned above, it is possible to maintain good charge carrier permeability and make it less likely for minor short circuits (leakage current) to occur. In this way, it is possible to achieve both input-output density and safety at high levels.

In addition, the thicknesses of the resin layers R1 and R2 are not particularly limited, but the effects mentioned above can be achieved by disposing the resin layers R1 and R2 at appropriate positions even if the layers are thin. The thicknesses of the resin layers R1 and R2 may each independently be, for example, 0.5 μm or higher, and typically 1 μm or higher, and preferably 2 μm or higher, for example 3 μm or higher. In addition, the upper limit of these thicknesses can be 10 μm or lower, and typically 7 μm or lower, for example 6 μm or lower. By setting the thicknesses of the resin layers R1 and R2 to fall within the range mentioned above, it is possible to stably achieve the effect of suppressing an increase in resistance.

The Gurley value (air permeability) of the overall separator 50 is not particularly limited, but this value may generally be higher than the Gurley value of the separator base 52. The Gurley value of the overall separator 50 can be, for example, not lower than 40 sec/100 mL and not higher than 300 sec/100 mL, and is preferably not lower than 50 sec/100 mL and not higher than 250 sec/100 mL, more preferably not lower than 60 sec/100 mL and not higher than 200 sec/100 mL, and particularly preferably not lower than 70 sec/100 mL and not higher than 150 sec/100 mL.

[Wound Electrode Body]

When constructing the battery 1, a flat wound electrode body 20 such as that shown in FIG. 2 is constructed using the positive electrode 30, negative electrode 40 and separator 50, which are prepared as described above. That is, the long positive electrode 30, the long negative electrode 40 and two long separators 50 are laminated in the order separator 50, negative electrode 40, separator 50, positive electrode 30 from below, and the obtained laminated structure is wound in the longitudinal direction. In other words, winding is carried out in such a way that the transverse direction, which is perpendicular to the longitudinal direction, is the winding axis. Here, for example if the shape of the cross section perpendicular to the winding axis is formed so as to be oval in shape, it is possible to construct a flat wound electrode body 20 that corresponds to the shape of a flat square battery case 10 such as that shown in FIG. 1. This type of wound electrode body 20 having an oval cross-section may be formed by squashing the cylindrically wound electrode body 20 by squeezing in one direction that is perpendicular to the winding axis. Alternatively, a flat wound electrode body 20 may be formed by winding the electrode body into a flat shape around a tabular winding axis. The exact shape of this type of flat wound electrode body 20 can be adjusted as appropriate according to the shape of the battery case 10 being used. Moreover, oval means a shape obtained by replacing the short sides of a rectangle with semicircles having diameters corresponding to the lengths of the short sides, but this is not strictly limited in geometric terms. The term oval encompasses shapes expressed by elliptical shapes or whorl shapes.

In addition, when laminating the positive electrode 30, the negative electrode 40 and the separator 50, the positive electrode 30 and the negative electrode 40 are overlaid in a somewhat staggered manner in the transverse direction so that the positive electrode current collector exposed part 36 of the positive electrode 30 and the negative electrode current collector exposed part 46 of the negative electrode 40 protrude from different sides in the transverse direction of the separator 50. At the result, the positive electrode current collector exposed part 36 and the negative electrode current collector exposed part 46 protrude outwards from the winding core portion (that is, the portion in which the positive and negative electrode active material layers 34 and 44 are overlaid) in the direction of the winding axis of the flat wound electrode body 20. By gathering positive electrode current collector exposed parts 36 and negative electrode current collector exposed parts 46 together in the direction of the short dimension of the oval cross section and forming current collector units 64 and 74, as shown in FIG. 1, current collection can be carried out with high efficiency.

[Non-Aqueous Electrolyte Solution]

Typically, a solution obtained by dissolving or dispersing a supporting electrolyte (for example, a lithium salt in the case of a lithium ion battery) in a non-aqueous solvent can be used as the non-aqueous electrolyte solution.

Organic solvents able to be used in ordinary lithium ion batteries, such as a variety of carbonates, ethers, esters, nitriles, sulfones and lactones, can be used without particular limitation as the non-aqueous solvent. Specific examples thereof include ethylene carbonate (EC), propylene carbonate (PC), diethyl carbonate (DEC), dimethyl carbonate (DMC), ethyl methyl carbonate (EMC). In addition, it is possible to use a non-aqueous solvent consisting of a cyclic or chain-like fluorinated carbonate, such as monofluoroethylene carbonate (MFEC), difluoroethylene carbonate (DFEC), monofluoromethyl-difluoromethyl carbonate (F-DMC), trifluorodimethyl carbonate (TFDMC) and methyl(2,2,2-trifluoroethyl)carbonate (MTFEC). It is possible to use one such non-aqueous solvent in isolation, or a mixed solvent of two or more types thereof.

A variety of electrolytes able to be used in ordinary lithium ion batteries can be appropriately selected and used as the supporting electrolyte. Examples of the supporting electrolyte include lithium salts such as $LiPF_6$, $LiBF_4$, $LiClO_4$, $LiAsF_6$, $Li(CF_3SO_2)_2N$ and $LiCF_3SO_3$. It is possible to use one such supporting electrolyte in isolation, or a combination of two or more types thereof. In addition, it is preferable for the non-aqueous electrolyte solution to be prepared in such a way that the concentration of the supporting electrolyte in the non-aqueous electrolyte solution falls within the range 0.7 to 1.3 mol/L.

This non-aqueous electrolyte solution may contain a variety of additives or the like as long as the characteristics of the non-aqueous electrolyte secondary battery of the present disclosure are not impaired. Examples of such additives include film-forming agents, overcharging prevention additives, and the like, and it is possible to use these in order to achieve one or two or more objectives selected from among improving the input-output characteristics of the battery, improving the cycle characteristics, improving the initial charging and discharging efficiency, improving safety, and the like. Specific examples of such additives include film-forming agents such as lithium bis(oxalato)borate (Li-BOB), vinylene carbonate (VC), vinylethylene carbonate (VEC) and fluoroethylene carbonate (FEC); overcharging prevention additives consisting of compounds able to generate gases upon overcharging, which are typified by aromatic compounds such as biphenyl (BP) and cyclohexylbenzene (CHB); surfactants; dispersing agents; thickening agents; anti-freeze agents, and the like. The concentration of these additives relative to the overall non-aqueous electrolyte solution varies according to the type of additive, but is generally approximately 0.1 mol/L and typically 0.005 to 0.05 mol/L) in the case of film-forming agents and generally approximately 6 mass % or less (and typically 0.5 to 4 mass %) in the case of overcharging prevention additives.

Moreover, the battery case 10 includes a square case main body 12, which is provided with an opening for introducing the flat wound electrode body 20, and a sealing body 14, which seals the opening in the case main body 12. A variety of materials, for example metal materials such as aluminum or alloys thereof and iron or alloys thereof, resin materials such as polyamides and laminate film type materials, can be advantageously used as these components. In the example shown in FIG. 1, the case main body (outer case) 12 is a thin square case made of an aluminum alloy, and is a bottomed flat box-shaped (typically rectangular) case, the upper surface of which is open. A positive electrode terminal 60, which is electrically connected to the positive electrode 30 of the wound electrode body 20, and a negative electrode terminal 70, which is electrically connected to the negative electrode 40 of the wound electrode body 20, are provided on the sealing body 14. Housing the wound electrode body 20 in the case main body 12 in a state whereby the wound electrode body is immobilized by the sealing body 14 is preferred from the perspectives of stabilizing the position at which the wound electrode body is housed and alleviating concerns such as breakages.

When immobilizing the wound electrode body 20 on the sealing body 14, the current collector unit 64 of the positive electrode current collector exposed part 36 and the positive electrode terminal 60 (for example, an aluminum material) should specifically be connected via a positive electrode current collector unit material 62, as shown in FIG. 1. In this way, the positive electrode 30 of the flat wound electrode body 20 and positive electrode terminal 60 can be electrically connected. Similarly, the current collector unit 74 of the negative electrode current collector exposed part 46 and the negative electrode terminal 70 (for example, a nickel material) should be connected via a negative electrode current collector unit material 72. In this way, the negative electrode 40 and the negative electrode terminal 70 can be electrically connected. By having this type of current collection structure, when the battery case 10 is placed horizontally so that the sealing body 14 is at the top, the wound electrode body 20 is housed in the battery case 10 in such a way that the long axis of the oval is oriented in a vertical direction. In other words, the wound electrode body is housed in the battery case so that the winding axis is in a horizontal direction. By introducing the non-aqueous electrolyte solution into the battery case 10 in this state, the winding axis direction, which is the direction of impregnation of the non-aqueous electrolyte solution, is horizontal, impregnation of the non-aqueous electrolyte solution occurs smoothly, and the time required for impregnation of the non-aqueous electrolyte solution can be shortened. Moreover, the positive and negative current collector unit materials 62 and 72, the positive and negative electrode terminals 60 and 70 and the positive and negative electrode current collectors 32 and 42 can be joined by means of, for example, ultrasonic welding, resistance welding, or the like. In addition, the opening in the case main body 12 can be advantageously sealed by the sealing body 14 by means of laser welding or the like.

Moreover, a current interrupt device (CID, not shown), which deploys when the pressure inside the battery case 10 increases to a prescribed pressure, may be provided inside the battery case 10. The CID should be constituted so as to cut an electrically conductive path from at least one of the electrode terminals to the electrode body 20 (for example, the charging path) when the pressure inside the battery case 10 increases, but the CID is not limited to a specific shape. Typically, the CID is provided between the positive electrode terminal 60 and the electrode body 20, and is constituted so that the electrically conductive path from the positive electrode terminal 60 to the electrode body 20 is cut when the pressure inside the battery case 10 increases.

After sealing the sealing body 14 on the case main body 12, it is possible to, for example, pour the non-aqueous electrolyte solution into the battery case 10 from a liquid supply port (not shown) provided in the sealing body 14. The non-aqueous electrolyte solution can be poured into the battery case during or after reducing the pressure inside the battery case 10. It is possible to prepare the non-aqueous electrolyte secondary battery by sealing the liquid supply port by means of a lid or the like after the non-aqueous electrolyte solution has been poured into the battery case. For example, it is preferable for the assembled battery to be allowed to stand for a period of approximately 5 to 50 hours after pouring the non-aqueous electrolyte solution into the battery case so that the non-aqueous electrolyte solution can impregnate sufficiently into the wound electrode body. By subsequently carrying out an appropriate initial charging treatment, functionality as a battery can be achieved.

The non-aqueous electrolyte secondary battery 1 disclosed here can be used in a variety of applications, but is constituted in such a way that variations in the concentration of the non-aqueous electrolyte solution are suppressed to a greater extent than in conventional products. Therefore, in cases where high rate charging and discharging is carried out, it is possible to supply sufficient electrolyte to the negative electrode and suppress an increase in resistance. Maintaining a low resistance over a long period of time in this way is linked to an improvement in cycle characteristics and means that it is possible to provide a secondary battery that exhibits high durability. In addition, the non-aqueous electrolyte secondary battery 1 disclosed here can be one that exhibits high reliability (safety) due to short circuits caused by liquid pockets of the non-aqueous electrolyte solution being prevented and a shutdown function being exhibited when the battery becomes hot. In this way, it is possible to achieve both safety and cycle characteristics during high rate charging and discharging (and especially high rate pulsed charging and discharging) at high levels. This type of constitution can also be advantageously used in, for example, batteries requiring relatively large capacities (for example, battery capacities of 20 Ah or higher, and typically 25 Ah or higher, for example 30 Ah or higher). Therefore, by making use of such characteristics, the features disclosed here can be used particularly advantageously in secondary batteries used in applications requiring high energy densities and high input-output densities and cycle characteristics and applications requiring high reliability. Examples of such applications include motive power sources for plug in hybrid vehicles (PHV), hybrid vehicles (HV) and electric vehicles (EV). This non-aqueous electrolyte secondary battery can typically be used in the form of a battery pack in which a plurality of batteries are connected in series and/or in parallel.

Test batteries for confirming the effects of the non-aqueous electrolyte secondary battery disclosed here were prepared as specific working examples, and the characteristics of these test batteries were evaluated. That is, in order to confirm the effects achieved by an insulating filter, a laminated cell type battery in which all the edges of the positive and negative active material layers were coated with an insulating filter was prepared, and the characteristics of this battery were evaluated. Moreover, the present disclosure is in no way limited to the specific examples given.

Embodiment 1

Example 1

[Construction of Test Lithium Ion Battery]

A lithium-nickel-manganese-cobalt composite oxide having a composition represented by the general formula $Li_{1.14}(Ni_{1/3}Co_{1/3}Mn_{1/3})O_2$ (NCM, average particle diameter 6 μm) was used as a positive electrode active material. Acetylene black (AB) was used as an electrically conductive material, and poly(vinylidene fluoride) (PVDF) was used as a binder. In addition, a positive electrode active material layer-forming slurry was prepared by weighing out the positive electrode active material, the electrically conductive material and the binder at a NCM:AB:PVDF mass ratio of 93:4:3, adding N-methylpyrrolidone (NMP) so that the solid content concentration (NV) was approximately 50 mass %, and then kneading the obtained mixture in a planetary mixer. Next, a positive electrode sheet was prepared by coating the positive electrode active material layer-forming slurry on both surfaces of a long aluminum foil having a thickness of 15 μm as a positive electrode current collector, and then drying the slurry. Moreover, the coated quantity of slurry was adjusted so that the mass per unit area of the positive electrode active material layer-forming slurry was 30 mg/cm². The positive electrode active material layer obtained in this way had a thickness (on each surface of the positive electrode current collector) of approximately 25 μm, a density of approximately 2.3 g/cm³ and an average pore diameter of approximately 0.15 μm.

A negative electrode active material layer-forming slurry was prepared by using flaky graphite (C, average particle diameter 10 μm) as a negative electrode active material, a styrene-butadiene rubber (SBR) as a binder and a sodium salt of carboxymethyl cellulose (CMC) as a thickening agent, weighing out these components at a C:SBR:CMC mass ratio of 98:1:1, adding ion exchanged water, and then kneading the obtained mixture. A negative electrode sheet having a negative electrode active material layer on both surfaces thereof was prepared by coating this slurry on both surfaces of a long copper foil having a thickness of 10 μm as a negative electrode current collector, and then drying the slurry. Moreover, the coated quantity of slurry was adjusted so that the mass per unit area of the negative electrode active material layer-forming slurry was 18 mg/cm². The negative electrode active material layer obtained in this way had a thickness (on each surface of the negative electrode current collector) of approximately 35 μm, a density of approximately 1.1 g/cm³ and an average pore diameter of approximately 1.5 μm.

A long non-woven fabric having a thickness of approximately 21 μm and consisting of polypropylene (PP) fibers was used as a separator base. The Gurley value of this non-woven fabric was 51 seconds.

In addition, a first resin slurry was prepared by blending a tetrafluoroethylene (PTFE) powder as a first resin and an alumina powder (average particle diameter 0.08 μm) at a mass ratio of 80:20, adding NMP so that the solid content proportion was 40 mass %, and then mixing the obtained mixture using a Clearmix.

A second resin slurry was prepared by blending a PVDF powder as a second resin and an alumina powder (average particle diameter 0.08 μm) at a mass ratio of 80:20, adding NMP so that the solid content proportion was 30 mass %, and then mixing the obtained mixture using a Clearmix.

In addition, a separator having the first resin layer and a second resin layer on the surfaces of a separator base was prepared by coating the first resin slurry at a thickness of 2 μm on one surface of the separator base, coating the second resin slurry at the thickness of 2 μm on the other surface of the separator base, and then drying the slurries.

A wound electrode body was obtained by overlaying the thus prepared positive electrode sheet and negative electrode sheet in an insulated state, with two separator sheets interposed therebetween, and then winding. Here, the separator was prepared in such a way that the surface of the separator on which the first resin layer was formed faced the positive electrode and the surface of the separator on which the second resin layer was formed faced the negative electrode. This wound electrode body was then housed in a battery case together with a non-aqueous electrolyte solution. A cylindrical aluminum case having a diameter of 18 mm and a height of 650 mm was used as the battery case. A non-aqueous electrolyte solution obtained by dissolving LiPF6 as a supporting electrolyte at a concentration of 1.0 mol/L in a mixed solvent containing ethylene carbonate (EC), dimethyl carbonate (DMC) and ethyl methyl carbonate (EMC) at a EC:DMC:EMC volume ratio of 3:4:3 was used as the non-aqueous electrolyte solution. A 18650 type lithium ion battery of Example 1 (theoretical capacity: approximately 1.0 Ah) was constructed by sealing the battery case.

Example 2

A separator having the second resin layer on both surfaces of the separator-based material was prepared by coating the second resin slurry on both surfaces of the separator base used in Example 1. A lithium ion battery of Example 3 was constructed using this separator, with other conditions being similar to those used in Example 1.

Example 3

A lithium ion battery of Example 3 was constructed by reversing the front and back of the separator used in Example 1, with other conditions being similar to those used in Example 1. That is, the battery was constructed by preparing the separator in such a way that the surface of the separator on which the second resin layer was formed faced the positive electrode and the surface of the separator on which the first resin layer was formed faced the negative electrode.

Example 4

A long non-woven fabric having a thickness of approximately 21 μm and consisting of poly(phenylene sulfide) (PPS) fibers was used instead of the separator base in Example 3. The Gurley value of this non-woven fabric was 55 seconds. A lithium ion battery of Example 4 was constructed, with other conditions being similar to those used in Example 3.

Example 5

A separator was prepared in the same way as in Example 1, except that the second resin layer was provided on one surface of the separator base, but the first resin layer was not provided on the other surface of the separator base. Here, the thickness of the separator base (non-woven fabric) was slightly increased, by an amount corresponding to the thickness of first resin layer that was not provided, to 23 μm. The Gurley value of this non-woven fabric was 55 seconds. A lithium ion battery of Example 5 was constructed by using this separator and disposing the surface of the separator on which the second resin layer was formed so as to face the negative electrode and disposing the surface of the separator on which the separator base was exposed so as to face the positive electrode, with other conditions being similar to those used in Example 1.

Example 6

A separator was prepared in the same way as in Example 1, except that the first resin layer was provided on one surface of the separator base, but the second resin layer was not provided on the other surface of the separator base. Here, the thickness of the separator base (non-woven fabric) was slightly increased, by an amount corresponding to the thickness of second resin layer that was not provided, to 23 μm. A lithium ion battery of Example 6 was constructed by using this separator and disposing the surface of the separator on which the second resin layer was formed so as to face the positive electrode and disposing the surface of the separator on which the separator base was exposed so as to face the negative electrode, with other conditions being similar to those used in Example 1.

Example 7

The separator base (non-woven fabric) used in Example 1 was used in isolation as the separator. Here, the thickness of the non-woven fabric was slightly increased, by an amount corresponding to the thickness of first resin layer and second resin layer that were not provided, to 25 μm. A lithium ion battery of Example 7 was constructed using this separator, with other conditions being similar to those used in Example 1.

[Physical Properties of Separator]

The Gurley values and porosity values of the separators prepared in Examples 1 to 7 were measured, and the results are shown in Table 1 below. The Gurley values were measured in accordance with the Gurley test method specified in JIS P 8117: 2009. In addition, the porosity values were calculated by dividing the total pore volume ($cm^3$), which was measured using a mercury porosimeter, by the apparent volume ($cm^3$) of the separator and then multiplying by 100. Moreover, the apparent volume of the separator can be calculated by cutting the separator to be measured into the shape of a prescribed test piece (square or rectangular) using a punching machine or a cutter, measuring the area ($cm^2$) as viewed from above and thickness (cm) of the test piece, and then multiplying the area by the thickness. Here, the thickness can be measured using, for example, a micrometer or thickness gauge (for example, a rotary caliper).

[High Rate Pulsed Cycle Test]

The thus prepared lithium ion batteries of Examples 1 to 7 were evaluated in terms of rate of increase in resistance following high rate pulsed charging and discharging, using the following procedure. More specifically, first, each battery was subjected to an initial conditioning treatment by being subjected to constant current (CC) charging at a rate of 1 C in a constant temperature chamber at 25° C. to a voltage of 4.1 V, allowed to rest for 5 minutes, subjected to constant current (CC) discharging at a rate of 1 C to a voltage of 3.0 V, and then allowed to rest for 5 minutes.

Next, the initial IV resistance of the battery was measured. That is, each battery was adjusted to a charged state corresponding to a SOC of 60% and then (CC) discharged at a rate of 1 C, 3 C, 5 C or 10 C, and the drop in voltage was measured every 10 seconds from the start of the discharging. A graph was plotted using the measured current value as the horizontal axis and the drop in voltage ($\Delta V$), which is obtained by subtracting the voltage after 10 seconds from the initial voltage, as the vertical axis, and the initial IV resistance value ($\Omega$) was calculated from the slope of the graph.

In addition, each battery was adjusted to a SOC of 60% in an environment at 25° C. and then subjected to 3000 cycles, one cycle of which consisted of a charging and discharging cycle having an excess of charging, in which high rate charging is carried out at a rate of 10 C for 80 seconds and relatively low rate discharging is then carried out at a rate of 2 C for 400 seconds. The IV resistance after 3000 cycles was measured in the same way as the initial IV resistance, and the rate of increase in resistance was determined. Moreover, the rate of increase in resistance (%) was determined using the formula: [IV resistance following charging and discharging cycle test/IV resistance before charging and discharging cycle test]×100. These results are shown in the "Rate of increase in resistance" column in Table 1.

TABLE 1

| | Base material (non-woven fabric) | | First resin layer (positive electrode side) | | | | Second resin layer (negative electrode side) | | | | Overall separator | | Rate of |
|---|---|---|---|---|---|---|---|---|---|---|---|---|---|
| Example | Material | Thickness (μm) | Gurley value (s) | Resin | Insulating filler | Resin/filler | Thickness (μm) | Resin | Insulating filler | Resin/filler | Thickness (μm) | Gurley value (s) | Porosity (%) | increase in resistance (%) |
| 1 | PP | 21 | 51 | PTFE | Alumina | 80/20 | 2 | PVDF | Alumina | 80/20 | 2 | 85 | 65 | 108 |
| 2 | PP | 21 | 51 | PVDF | Alumina | 80/20 | 2 | PVDF | Alumina | 80/20 | 2 | 90 | 62 | 114 |
| 3 | PP | 21 | 51 | PVDF | Alumina | 80/20 | 2 | PTFE | Alumina | 80/20 | 2 | 85 | 65 | 133 |
| 4 | PPS | 21 | 55 | PVDF | Alumina | 80/20 | 2 | PTFE | Alumina | 80/20 | 2 | 85 | 65 | 138 |
| 5 | PP | 23 | 55 | — | — | — | — | PVDF | Alumina | 80/20 | 2 | 69 | 69 | 140 |
| 6 | PP | 23 | 55 | PTFE | Alumina | 80/20 | 2 | — | — | — | — | 68 | 70 | 145 |
| 7 | PP | 25 | 50 | — | — | — | — | — | — | — | — | 50 | 79 | Short circuit |

As shown in Table 1, a battery that used only the non-woven fabric of Example 7 as a separator exhibited low insulation between the positive electrode and negative electrode in an overcharged state and underwent a short circuit during charging and discharging cycles. Meanwhile, it was understood that this type of short circuit can be prevented by providing a resin layer on one of the positive electrode side and negative electrode side of the separator, as shown by Example 5 and Example 6. Moreover, it was found that in such cases, the provision of a second resin layer consisting of PVDF on the negative electrode side surface of the separator exhibited a better effect of suppressing an increase in resistance than the provision of a first resin layer consisting of PTFE on the positive electrode side surface of the separator. Furthermore, as shown in Examples 1 to 4, it was confirmed that a case in which a resin layer was provided on each surface of the separator prevented short circuits and suppressed an increase in resistance during high rate pulsed charging and discharging cycles having an excess of charging better than a case in which a resin layer was provided on only one surface of the separator.

Moreover, it was understood that differences in the rate of increase in resistance occurred in high rate pulsed charging and discharging cycles having an excess of charging, depending on the combinations of resins provided on the positive electrode side surface and negative electrode side surface of the separator, as shown by Examples 1 to 3. That is, it was understood that the increase in resistance following the cycles was 108%, which was the lowest increase in resistance, in a case where the first resin layer provided on the positive electrode side surface of the separator was PTFE and the second resin layer provided on the negative electrode side surface of the separator was PVDF, as shown by Example 1. Moreover, it was understood that even in the case of a separator per se having the same constitution as that of Example 1, reversing the front and back of the separator, with the resin layers on the positive electrode side and negative electrode side being reversed, as shown by Example 3, was more effective than cases in which a resin layer is provided on only one surface of the separator (Examples 6 and 7), but the effect of suppressing an increase in resistance was significantly diminished.

In addition, in light of the results of Example 5 and Example 6, it can be said that the provision of a second resin layer consisting of PVDF exhibits a higher effect of suppressing an increase in resistance than the provision of a first resin layer consisting of PTFE. However, by forming both the first resin layer and a second resin layer from PVDF, as in Example 2, the rate of increase in resistance was higher than that in Example 1. That is, it was confirmed that forming the first resin layer from PTFE and forming the second resin layer from PVDF in the secondary battery of Example 1 was optimal in terms of suppressing an increase in resistance.

Moreover, a slight change in the rate of increase in resistance was observed by altering the material of the separator base, as shown by Example 4, but the difference in the rate of increase in resistance between Example 4 and Example 5 was slight, and it was confirmed that the compositions of the first resin layer and a second resin layer and the combination of these resins had a greater effect on the rate of increase in resistance than the material of the separator base. In addition, it was confirmed that PP was more suitable than PPS as the material of the separator base.

Embodiment 2

In Examples 8 to 22 below, separators were prepared by altering the constitutions of the separator base and first resin layer used in Embodiment 1, and the effect on the rate of increase in resistance when lithium ion batteries were constructed was investigated. The Gurley values, porosity values and rates of increase in resistance of the lithium ion batteries prepared in Examples 8 to 22 were measured under the same conditions as those used in Embodiment 1, and these results are shown in Table 2 below. Moreover, Table 2 also includes the results of Example 1 for reference purposes.

Example 8

A long non-woven fabric having a thickness of approximately 21 μm and consisting of PPS fibers was used instead of the separator base used in Example 1 in Embodiment 1. The Gurley value of this non-woven fabric was 55 seconds. A lithium ion battery of Example 8 was constructed, with other conditions being similar to those used in Example 1.

Example 9

A long non-woven fabric having a thickness of approximately 21 μm and consisting of PET fibers was used instead of the separator base used in Example 1 in Embodiment 1. The Gurley value of this non-woven fabric was 55 seconds. A lithium ion battery of Example 9 was constructed, with other conditions being similar to those used in Example 1.

Example 10

A lithium ion battery of Example 10 was constructed in the same way as Example 1 in Embodiment 1, except that the alumina powder incorporated in the first resin slurry was replaced with a boehmite powder (average particle diameter 0.06 μm), with other conditions being similar to those used in Example 1.

Example 11

A lithium ion battery of Example 11 was constructed in the same way as Example 1 in Embodiment 1, except that the alumina powder incorporated in the first resin slurry was replaced with a magnesia powder (average particle diameter 0.05 μm), with other conditions being similar to those used in Example 1.

Example 12

A lithium ion battery of Example 12 was constructed in the same way as Example 1 in Embodiment 1, except that the alumina powder incorporated in the first resin slurry was replaced with a titania powder (average particle diameter 0.06 μm), with other conditions being similar to those used in Example 1.

Example 13

The PVDF powder and alumina powder used in the first resin slurry in Example 1 in Embodiment 1 were blended at a mass ratio of 90:10. In addition, a separator was prepared by slightly increasing the thickness of the separator base, by an amount corresponding to the reduction in the quantity of alumina powder, to 23 μm and forming the first resin layer and second resin layer on the surfaces of the separator base. A lithium ion battery of Example 13 was constructed using this separator, with other conditions being similar to those used in Example 1.

Example 14

The PVDF powder and alumina powder used in the first resin slurry in Example 1 in Embodiment 1 were blended at a mass ratio of 70:30. A lithium ion battery of Example 14 was constructed, with other conditions, including the thickness of the separator base, being similar to those used in Example 1.

Example 15

The PVDF powder and alumina powder used in the first resin slurry in Example 1 in Embodiment 1 were blended at a mass ratio of 60:40. A lithium ion battery of Example 15 was constructed, with other conditions, including the thickness of the separator base, being similar to those used in Example 1.

Example 16

The PVDF powder and alumina powder used in the first resin slurry in Example 1 in Embodiment 1 were blended at a mass ratio of 50:50. A lithium ion battery of Example 16 was constructed, with other conditions, including the thickness of the separator base, being similar to those used in Example 1.

Example 17

A separator was prepared in the same way as in Example 1 in Embodiment 1, except that the thickness of the first resin layer was reduced to 1 μm and the thickness of the separator base was increased by the same amount to 24 μm, with other conditions being similar to those used in Example 1. The Gurley value of this separator base was 53. Using this separator, a lithium ion battery of Example 17 was constructed in the same way as in Example 1.

Example 18

A separator was prepared in the same way as in Example 1 in Embodiment 1, except that the thickness of the first resin layer was increased to 3 μm and the thickness of the separator base was slightly reduced to 22 μm, with other conditions being similar to those used in Example 1. The Gurley value of this separator base was 50. Using this separator, a lithium ion battery of Example 18 was constructed in the same way as in Example 1.

Example 19

A separator was prepared in the same way as in Example 1 in Embodiment 1, except that the thickness of the first resin layer was increased to 4 μm and the thickness of the separator base remained the same at 21 μm, with other conditions being similar to those used in Example 1. The Gurley value of this separator base was 50. Using this separator, a lithium ion battery of Example 19 was constructed in the same way as in Example 1.

Example 20

A separator was prepared in the same way as in Example 1 in Embodiment 1, except that the thickness of the first resin layer was increased to 5 μm and the thickness of the separator base was reduced by the same amount to 20 μm, with other conditions being similar to those used in Example 1. The Gurley value of this separator base was 49. Using this separator, a lithium ion battery of Example 20 was constructed in the same way as in Example 1.

Example 21

A separator was prepared in the same way as in Example 1 in Embodiment 1, except that the thickness of the first resin layer was increased to 6 μm and the thickness of the separator base was reduced by the same amount to 19 μm, with other conditions being similar to those used in Example 1. The Gurley value of this separator base was 47. Using this separator, a lithium ion battery of Example 21 was constructed in the same way as in Example 1.

Example 22

A separator was prepared in the same way as in Example 1 in Embodiment 1, except that the thickness of the first resin layer was increased to 7 μm and the thickness of the separator base was reduced by the same amount to 18 μm, with other conditions being similar to those used in Example 1. The Gurley value of this separator base was 45. Using this separator, a lithium ion battery of Example 22 was constructed in the same way as in Example 1.

Moreover, the overall thickness of the separator in Examples 17 to 22 was 27 μm, not 25 μm, but this can be thought to fall within error limits (within approximately 2 μm) arising from unavoidable product variations.

TABLE 2

| | Base material (non-woven fabric) | | First resin layer (positive electrode side) | | | | Second resin layer (negative electrode side) | | | | Overall separator | | Rate of |
| --- | --- | --- | --- | --- | --- | --- | --- | --- | --- | --- | --- | --- | --- |
| Example | Material | Thickness (μm) | Gurley value (s) | Resin | Insulating filler | Resin/filler | Thickness (μm) | Resin | Insulating filler | Resin/filler | Thickness (μm) | Gurley value (s) | Porosity (%) | increase in resistance (%) |
| 1 | PP | 21 | 51 | PTFE | Alumina | 80/20 | 2 | PVDF | Alumina | 80/20 | 2 | 85 | 65 | 108 |
| 8 | PPS | 21 | 55 | PTFE | Alumina | 80/20 | 2 | PVDF | Alumina | 80/20 | 2 | 85 | 65 | 107 |
| 9 | PET | 21 | 46 | PTFE | Alumina | 80/20 | 2 | PVDF | Alumina | 80/20 | 2 | 86 | 65 | 107 |
| 10 | PP | 21 | 51 | PTFE | Boehmite | 80/20 | 2 | PVDF | Alumina | 80/20 | 2 | 82 | 67 | 105 |
| 11 | PP | 21 | 51 | PTFE | Magnesia | 80/20 | 2 | PVDF | Alumina | 80/20 | 2 | 84 | 68 | 106 |
| 12 | PP | 21 | 51 | PTFE | Titania | 80/20 | 2 | PVDF | Alumina | 80/20 | 2 | 85 | 63 | 107 |
| 13 | PP | 21 | 51 | PTFE | Alumina | 90/10 | 2 | PVDF | Alumina | 80/20 | 2 | 210 | 38 | 120 |
| 14 | PP | 21 | 51 | PTFE | Alumina | 70/30 | 2 | PVDF | Alumina | 80/20 | 2 | 75 | 65 | 108 |
| 15 | PP | 21 | 51 | PTFE | Alumina | 60/40 | 2 | PVDF | Alumina | 80/20 | 2 | 72 | 68 | 110 |
| 16 | PP | 21 | 51 | PTFE | Alumina | 50/50 | 2 | PVDF | Alumina | 80/20 | 2 | 65 | 75 | 125 |
| 17 | PP | 24 | 53 | PTFE | Alumina | 80/20 | 1 | PVDF | Alumina | 80/20 | 2 | 80 | 66 | 132 |
| 18 | PP | 22 | 50 | PTFE | Alumina | 80/20 | 3 | PVDF | Alumina | 80/20 | 2 | 90 | 62 | 105 |

TABLE 2-continued

| | Base material (non-woven fabric) | | | First resin layer (positive electrode side) | | | | Second resin layer (negative electrode side) | | | | Overall separator | | Rate of increase in resistance (%) |
|---|---|---|---|---|---|---|---|---|---|---|---|---|---|---|
| Example | Material | Thickness (μm) | Gurley value (s) | Resin | Insulating filler | Resin/ filler | Thickness (μm) | Resin | Insulating filler | Resin/ filler | Thickness (μm) | Gurley value (s) | Porosity (%) | |
| 19 | PP | 21 | 50 | PTFE | Alumina | 80/20 | 4 | PVDF | Alumina | 80/20 | 2 | 92 | 62 | 105 |
| 20 | PP | 20 | 49 | PTFE | Alumina | 80/20 | 5 | PVDF | Alumina | 80/20 | 2 | 92 | 61 | 104 |
| 21 | PP | 19 | 47 | PTFE | Alumina | 80/20 | 6 | PVDF | Alumina | 80/20 | 2 | 95 | 60 | 104 |
| 22 | PP | 18 | 45 | PTFE | Alumina | 80/20 | 7 | PVDF | Alumina | 80/20 | 2 | 107 | 58 | 118 |

It was understood that the rate of increase in resistance could be slightly reduced by altering the material of the separator base, as shown by Examples 8 to 9. However, this effect of reducing the rate of increase in resistance is slight, and it is thought that the contribution of the material of the separator base to this effect is not particularly great.

In addition, it was understood that the rate of increase in resistance could be slightly reduced by altering the type of filler incorporated in the first resin layer, as shown by Examples 10 to 12. However, this effect of reducing the rate of increase in resistance is slight, and it is thought that the contribution of the type of filler to this effect is not particularly great.

It was understood that the rate of increase in resistance could be altered by altering the proportions of the resin and filler incorporated in the first resin layer, as shown by Examples 13 to 16. That is, in these examples, the rate of increase in resistance was at a minimum when the proportion of the filler was approximately 30 mass % (Example 14), and it was confirmed that by reducing the proportion of the filler to 10 mass % (Example 14) or increasing the proportion of the filler to 50 mass % (Example 16), the effect of reducing the rate of increase in resistance was diminished.

In Examples 17 to 22, it was understood that the rate of increase in resistance could be changed by altering the thickness of the first resin layer. In these examples, it was understood that a lower rate of increase in resistance could be stably maintained by setting the thickness of the first resin layer to fall within the range 3 to 6 μm. Moreover, a short circuit such as that which occurred in Example 7 did not occur in Example 17, in which the thickness of the first resin layer was reduced to 1 μm, but it was understood that an increase in the rate of increase in resistance caused by an increase in the thickness of the separator base was greater than the reduction in the rate of increase in resistance achieved by providing the first resin layer. In addition, the effect of increasing the thickness of the first resin layer to 7 μm in Example 22 was not as great as the effect of reducing the thickness of the separator base in Example 17, but it was understood that an increase in the thickness of the first resin layer tended to diminish the effect of reducing the rate of increase in resistance.

Embodiment 3

In Examples 23 to 35, separators were prepared mainly by altering the constitution of the second resin layer used in Embodiment 1, and the effect on the rate of increase in resistance when lithium ion batteries were constructed was investigated. The Gurley values, porosity values and rates of increase in resistance of the separators in the lithium ion batteries prepared in Examples 23 to 35 were measured under the same conditions as those used in Embodiment 1, and these results are shown in Table 3 below. Moreover, Table 3 also includes the results of Example 1 for reference purposes.

Example 23

A lithium ion battery of Example 23 was constructed in the same way as Example 1 in Embodiment 1, except that the alumina powder incorporated in the second resin slurry was replaced with a boehmite powder (average particle diameter 0.06 μm), with other conditions being similar to those used in Example 1.

Example 24

A lithium ion battery of Example 24 was constructed in the same way as Example 1 in Embodiment 1, except that the alumina powder incorporated in the second resin slurry was replaced with a magnesia powder (average particle diameter 0.05 μm), with other conditions being similar to those used in Example 1.

Example 25

A lithium ion battery of Example 25 was constructed in the same way as Example 1 in Embodiment 1, except that the alumina powder incorporated in the second resin slurry was replaced with a titania powder (average particle diameter 0.06 μm), with other conditions being similar to those used in Example 1.

Example 26

The PVDF powder and alumina powder used in the second resin slurry in Example 1 in Embodiment 1 were blended at a mass ratio of 90:10. In addition, a separator was prepared by slightly increasing the thickness of the separator base, by an amount corresponding to the reduction in the quantity of alumina powder, to 23 μm and forming the first resin layer and second resin layer on the surfaces of the separator base. A lithium ion battery of Example 26 was constructed using this separator, with other conditions being similar to those used in Example 1.

Example 27

The PVDF powder and alumina powder used in the second resin slurry in Example 1 in Embodiment 1 were blended at a mass ratio of 70:30. A lithium ion battery of Example 27 was constructed, with other conditions being similar to those used in Example 1.

Example 28

The PVDF powder and alumina powder used in the second resin slurry in Example 1 in Embodiment 1 were blended at a mass ratio of 60:40. A lithium ion battery of Example 28 was constructed, with other conditions being similar to those used in Example 1.

Example 29

The PVDF powder and alumina powder used in the second resin slurry in Example 1 in Embodiment 1 were blended at a mass ratio of 50:50. A lithium ion battery of Example 29 was constructed, with other conditions being similar to those used in Example 1.

Example 30

A separator was prepared in the same way as in Example 1 in Embodiment 1, except that the thickness of the second resin layer was reduced to 1 μm and the thickness of the separator base was increased by the same amount to 22 μm, with other conditions being similar to those used in Example 1. The Gurley value of this separator base was 50. Using this separator, a lithium ion battery of Example 30 was constructed in the same way as in Example 1.

Example 31

A separator was prepared in the same way as in Example 1 in Embodiment 1, except that the thickness of the second resin layer was increased to 3 μm and the thickness of the separator base was slightly reduced to 20 μm, with other conditions being similar to those used in Example 1. The Gurley value of this separator was 49. Using this separator, a lithium ion battery of Example 31 was constructed in the same way as in Example 1.

Example 32

A separator was prepared in the same way as in Example 1 in Embodiment 1, except that the thickness of the second resin layer was increased to 4 μm and the thickness of the separator base was slightly reduced to 19 μm, with other conditions being similar to those used in Example 1. The Gurley value of this separator was 47. Using this separator, a lithium ion battery of Example 32 was constructed in the same way as in Example 33

A separator was prepared in the same way as in Example 1 in Embodiment 1, except that the thickness of the second resin layer was increased to 5 μm and the thickness of the separator base was reduced by the same amount to 18 μm, with other conditions being similar to those used in Example 1. The Gurley value of this separator was 45. Using this separator, a lithium ion battery of Example 33 was constructed in the same way as in Example 1.

Example 34

A separator was prepared in the same way as in Example 1 in Embodiment 1, except that the thickness of the second resin layer was increased to 6 μm and the thickness of the separator base was reduced by the same amount to 17 μm, with other conditions being similar to those used in Example 1. The Gurley value of this separator was 43. Using this separator, a lithium ion battery of Example 34 was constructed in the same way as in Example 1.

Example 35

A separator was prepared in the same way as in Example 1 in Embodiment 1, except that the thickness of the second resin layer was increased to 7 μm and the thickness of the separator base was reduced by the same amount to 16 μm, with other conditions being similar to those used in Example 1. The Gurley value of this separator was 40. Using this separator, a lithium ion battery of Example 35 was constructed in the same way as in Example 1.

TABLE 3

| | Base material (non-woven fabric) | | Positive electrode side resin layer | | | | Negative electrode side resin layer | | | | Overall separator | | Rate of |
| --- | --- | --- | --- | --- | --- | --- | --- | --- | --- | --- | --- | --- | --- |
| Example | Material | Thickness (μm) | Gurley value (s) | Resin | Insulating filler | Resin/filler | Thickness (μm) | Resin | Insulating filler | Resin/filler | Thickness (μm) | Gurley value (s) | Porosity (%) | increase in resistance (%) |
| 1 | PP | 21 | 51 | PTFE | Alumina | 80/20 | 2 | PVDF | Alumina | 80/20 | 2 | 85 | 65 | 108 |
| 23 | PP | 21 | 51 | PTFE | Alumina | 80/20 | 2 | PVDF | Boehmite | 80/20 | 2 | 82 | 65 | 106 |
| 24 | PP | 21 | 51 | PTFE | Alumina | 80/20 | 2 | PVDF | Magnesia | 80/20 | 2 | 84 | 66 | 106 |
| 25 | PP | 21 | 51 | PTFE | Alumina | 80/20 | 2 | PVDF | Titania | 80/20 | 2 | 84 | 63 | 108 |
| 26 | PP | 21 | 51 | PTFE | Alumina | 80/20 | 2 | PVDF | Alumina | 90/10 | 2 | 205 | 40 | 122 |
| 27 | PP | 21 | 51 | PTFE | Alumina | 80/20 | 2 | PVDF | Alumina | 70/30 | 2 | 77 | 67 | 107 |
| 28 | PP | 21 | 51 | PTFE | Alumina | 80/20 | 2 | PVDF | Alumina | 60/40 | 2 | 75 | 68 | 109 |
| 29 | PP | 21 | 51 | PTFE | Alumina | 80/20 | 2 | PVDF | Alumina | 50/50 | 2 | 63 | 77 | 128 |
| 30 | PP | 22 | 50 | PTFE | Alumina | 80/20 | 2 | PVDF | Alumina | 80/20 | 1 | 79 | 66 | 131 |
| 31 | PP | 20 | 49 | PTFE | Alumina | 80/20 | 2 | PVDF | Alumina | 80/20 | 3 | 88 | 62 | 107 |
| 32 | PP | 19 | 47 | PTFE | Alumina | 80/20 | 2 | PVDF | Alumina | 80/20 | 4 | 90 | 62 | 107 |
| 33 | PP | 18 | 45 | PTFE | Alumina | 80/20 | 2 | PVDF | Alumina | 80/20 | 5 | 91 | 61 | 108 |
| 34 | PP | 17 | 43 | PTFE | Alumina | 80/20 | 2 | PVDF | Alumina | 80/20 | 6 | 95 | 60 | 110 |
| 35 | PP | 16 | 40 | PTFE | Alumina | 80/20 | 2 | PVDF | Alumina | 80/20 | 7 | 104 | 58 | 130 |

It was understood that the rate of increase in resistance could also be slightly lowered by altering the type of filler incorporated in the second resin layer, as shown by Examples 23 to 25. However, this effect of reducing the rate of increase in resistance is slight, and it is thought that the contribution of the type of filler to this effect is not particularly great.

It was understood that the rate of increase in resistance could be altered by altering the proportions of the resin and filler incorporated in the second resin layer, as shown by Examples 26 to 29. That is, in these examples, the rate of increase in resistance was at a minimum when the proportion of the filler was approximately 30 mass % (Example 27), and it was confirmed that by reducing the proportion of the filler to, for example, 10 mass % (Example 26) or increasing the proportion of the filler to 50 mass % (Example 29), the effect of reducing the rate of increase in resistance was diminished.

In Examples 31 to 35, it was understood that the rate of increase in resistance could be changed by altering the thickness of the second resin layer. In these examples, it was understood that a lower rate of increase in resistance of 110% or lower could be stably maintained by setting the thickness of the second resin layer to fall within the range 3 to 6 µm. Moreover, a short circuit such as that which occurred in Example 7 did not occur in Example 30, in which the thickness of the first resin layer was reduced to 1 µm, but it was understood that an increase in the rate of increase in resistance caused by an increase in the thickness of the separator base was greater than the reduction in the rate of increase in resistance achieved by providing the second resin layer. In addition, the effect of increasing the thickness of the second resin layer to 7 µm in Example 35 was not as great as the effect of reducing the thickness of the separator base in Example 30, but it was understood that an increase in the thickness of the first resin layer tended to diminish the effect of reducing the rate of increase in resistance.

Specific examples of the present disclosure have been explained in detail above, but these are merely examples, and do not limit the scope of the invention. For example, the embodiments given above explicitly disclose modes in which insulating fillers are blended in resin layers, but the present invention is not limited to these modes, and it is possible, for example, to form resin layers without blending insulating fillers. In such cases, resin layers can be advantageously formed by using publicly known electrospinning methods. The features set forth in the claims of the present application include modes obtained by variously modifying or altering the specific examples given above.

REFERENCE SIGNS LIST

1 Secondary battery
10 Battery case
12 Case main body
14 Sealing body
20 Wound electrode body
30 Positive electrode
32 Positive electrode current collector
33 Positive electrode current collector exposed part
34 Positive electrode active material layer
36 Current collector exposed part
40 Negative electrode
42 Negative electrode current collector
43 Negative electrode current collector exposed part
44 Positive electrode active material layer
46 Current collector exposed part
50 Separator
52 Separator base
R1 First resin layer
R2 Second resin layer
60 Positive electrode terminal
70 Negative electrode terminal

What is claimed is:

1. A non-aqueous electrolyte secondary battery comprising:
   a positive electrode;
   a negative electrode;
   a separator interposed between the positive electrode and negative electrode, the separator comprising:
      a separator base made of a non-woven fabric;
      a first resin layer provided on a surface of the separator base that faces the positive electrode; and
      a second resin layer provided on a surface of the separator base that faces the negative electrode;
   and
   a non-aqueous electrolyte solution, wherein
   a resin matrix of the first resin layer is constituted from at least one of polytetrafluoroethylene and a copolymer containing polytetrafluoroethylene as a primary component, and
   a resin matrix of the second resin layer is constituted from at least one of poly(vinylidene fluoride) and a copolymer containing poly(vinylidene fluoride) as a primary component.

2. The non-aqueous electrolyte secondary battery according to claim 1, wherein the separator base has a Gurley value, as determined using the Gurley test method, of not less than 40 sec/100 mL and not more than 55 sec/100 mL.

3. The non-aqueous electrolyte secondary battery according to claim 1, wherein at least one of the first resin layer and second resin layer contains insulating inorganic particles.

4. The non-aqueous electrolyte secondary battery according to claim 1, wherein an average thickness of the first resin layer and that of the second resin layer are each 7 µm or less.

5. The non-aqueous electrolyte secondary battery according to claim 1, wherein
   the positive electrode includes a positive electrode active material layer having a porous structure on a surface of a positive electrode current collector,
   the negative electrode includes a negative electrode active material layer having a porous structure on a surface of a negative electrode current collector, and
   an average pore diameter in the negative electrode active material layer is greater than an average pore diameter in the positive electrode active material layer.

6. The non-aqueous electrolyte secondary battery according to claim 1, wherein the positive electrode, the negative electrode and the separator have an elongated shape, and a wound electrode body is constituted by overlaying and winding the positive electrode and the negative electrode in such a way as to be insulated from each other by the separator.

* * * * *